United States Patent
Groh et al.

(10) Patent No.: US 12,459,454 B2
(45) Date of Patent: Nov. 4, 2025

(54) POWER-DISTRIBUTING DEVICE AND MOTOR VEHICLE

(71) Applicant: AUDI AG, Ingolstadt (DE)

(72) Inventors: Thorsten Groh, Neuburg an der Donau (DE); Martin Schneider, Großmehring (DE); Tihomir Tomanic, Pfinztal (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/580,911

(22) PCT Filed: Jul. 21, 2022

(86) PCT No.: PCT/EP2022/070449
§ 371 (c)(1),
(2) Date: Jan. 19, 2024

(87) PCT Pub. No.: WO2023/001947
PCT Pub. Date: Jan. 26, 2023

(65) Prior Publication Data
US 2025/0100486 A1   Mar. 27, 2025

(30) Foreign Application Priority Data
Jul. 21, 2021   (DE) ...................... 10 2021 118 868.7

(51) Int. Cl.
*B60R 16/03*   (2006.01)
(52) U.S. Cl.
CPC .................. *B60R 16/03* (2013.01)
(58) Field of Classification Search
CPC ...................................................... B60R 16/03
(Continued)

(56) References Cited

U.S. PATENT DOCUMENTS 10,855,105 B2   12/2020   Boesch
2022/0166249 A1*   5/2022   Shindo .................. B60R 16/033

FOREIGN PATENT DOCUMENTS

DE   199 44 833 A1   3/2001
DE   102 51 589   5/2004
(Continued)

OTHER PUBLICATIONS

English Translation of IPRP (PCT/IB/338 and PCT/IB/373) (Jan. 18, 2024) and the Written Opinion of ISA (PCT/ISA/237) issued in counterpart International Application No. PCT/EP2022/070449 on Nov. 17, 2022 (11 pages).

(Continued)

*Primary Examiner* — Michael R. Fin
(74) *Attorney, Agent, or Firm* — STAAS & HALSEY LLP (57) ABSTRACT

A power-distributing device for a vehicle electrical system of a motor vehicle may include at least a first power source terminal and a second power source terminal, at least a first safety supply terminal and a second safety supply terminal, a coupling unit to electrically couple the power source and safety supply terminals, and, for each of at least two power source terminals, a source switching element is to electrically couple the first and second power source terminals to the coupling unit, depending on a switching state. In an example, the power-distributing device may have, for each of at least two safety supply terminals, a supply switching element to electrically couple the first and second safety supply terminals to the coupling unit (24), depending on a switching state.

13 Claims, 5 Drawing Sheets

(58) Field of Classification Search
USPC .................................................. 307/10.1, 64
See application file for complete search history.

(56) References Cited

FOREIGN PATENT DOCUMENTS

| | | |
|---|---|---|
| DE | 10 2005 004 330 A1 | 8/2006 |
| DE | 10 2013 225 020 A1 | 6/2015 |
| DE | 10 2014 208 201 A1 | 11/2015 |
| DE | 10 2015 002 061 A1 | 8/2016 |
| DE | 10 2017 208 030 A1 | 11/2018 |
| DE | 10 2019 118 011 A1 | 1/2020 |
| DE | 10 2021 118 868.7 | 7/2021 |
| EP | 1 561 269 | 5/2004 |
| WO | PCT/EP2022/070449 | 7/2022 |

OTHER PUBLICATIONS

Notification concerning transmittal of IPRP (PCT/IB/326) in Counterpart International Application No. PCT/EP2022/070449 dated Feb. 1, 2024.
International Search Report issued in International Application No. PCT/EP2022/070449 dated Nov. 17, 2022.
Written Opinion issued in International Application No. PCT/EP2022/070449 dated Nov. 17, 2022.
German Office Action issued in German Application No. 10 2021 118 868.7 dated Apr. 29, 2022.

\* cited by examiner

POWER-DISTRIBUTING DEVICE AND MOTOR VEHICLE

CROSS-REFERENCE TO RELATED APPLICATIONS

This application is a U.S. national stage of International Application No. PCT/EP2022/070449, filed on Jul. 21, 2022, which claims the priority benefit of German Patent Application No. 10 2021 118 868.7 filed on Jul. 21, 2021. Both the International Application and the German Patent Application are incorporated by reference herein in their entirety.

BACKGROUND

1. Field

According to a first aspect, examples of an invention may relate to a power-distributing device for a motor vehicle, with at least a first and a second power source terminal, at least a first and a second safety supply terminal, a coupling apparatus for electrically coupling the terminals as well as each one source switching element for each of the at least two power source terminals, which is configured to electrically couple the respective power source terminal with the coupling apparatus depending on a switching state. Furthermore, the examples may relate to a power-distributing device for a motor vehicle according to the second aspect, with at least a first and a second power source terminal, at least a first and a second safety supply terminal, at least one conventional supply terminal, a coupling apparatus for electrically coupling the terminals, a source switching element for one of the at least two power source terminals, which is configured to electrically couple the respective power source terminal with the coupling apparatus depending on a switching state, as well as a supply switching element for the at least one conventional supply terminal, which is configured to electrically couple the conventional supply terminal with the coupling apparatus depending on a switching state. Finally, the examples may also relate to a motor vehicle with a vehicle electrical system, wherein the vehicle electrical system comprises a power-distributing device according to the examples described.

2. Description of the Related Art

Power-distributing devices as well as motor vehicles with vehicle electrical systems, which comprise power-distributing devices, are extensively known in the prior art such that a separate printed evidence is not required in this respect. Power-distributing devices serve for distributing electrical energy in a vehicle electrical system, in particular a vehicle electrical system of a motor vehicle. For this purpose, electrical energy sources and/or electrical energy drains are connected with the vehicle electrical system as electrical devices. They may be connected with at least one power-distributing device. The power-distributing device is in particular employed if electrical energy is to be distributed, with which electrical devices are connected, which are to be supplied with substantially the same electrical voltage. For this purpose, the power-distributing device can comprise a coupling apparatus, which in turn can comprise for example at least one busbar or the like. However, further elements can moreover also be provided to form the coupling apparatus, for example protective elements, switching elements and/or the like. Busbars are for example disclosed by DE 10 2015 002 061 A1.

Nowadays, it is usual that motor vehicles are equipped with steering and/or braking systems, which at least partially assist the driver in critical situations. Such steering and/or braking systems often use electrical energy, such that an immediate action of the driver is no longer required. However, if an error in such a steering and/or braking system or in the energy supply of one of these systems occurs, a mechanic or hydraulic fallback level is provided to thereby further allow the steerability and/or braking capability of the motor vehicle to the driver.

The increasing automation of driving, in particular with respect to automated driving, in particular highly automated driving (HAF), allows providing novel concepts for interiors of future motor vehicles, in which occupants of the motor vehicle can occupy very different positions, in particular also the driver. Thus, it can for example be provided that a sleeping position or a rotation of a seat are allowed. However, this also requires new concepts with respect to for example steering and/or braking systems, because mechanical and hydraulic control devices, respectively, are possibly no longer reachable for the driver on the one hand, or an automated, in particular autonomous drive of the motor vehicle is for example also to be able to be effected independently of a driver action. In such systems, only a purely electrical or electronic connection is then usually present, for example between a sensor, such as for example a steering wheel or a brake pedal, and an actuator, for example a steering motor, a braking motor or the like. This is also called X-by-wire. Thus, highly available vehicle systems are required, which require a safe electrical energy supply for the intended operation and comply with the requirement to the highest safety standard according to Automotive Safety Integrity Level D (ASIL D according to ISO26262) as well as associated laws such as for example ECE R 79 for steer-by-wire.

Therefore, it is required in the prior art to direct particular attention to the electrical energy supply of the systems, in particular of the safety-relevant systems. In the prior art, it is known to provide separated redundant energy supply paths hereto, for example from DE 102 51 589 A1, which discloses a vehicle electrical system for supplying at least one load with increased requirements to the availability of the vehicle electrical system. Here, two batteries are coupled with each other via a DC/DC converter. However, this proves to be expensive not only with respect to the cost and with respect to the effort, for example, with respect to installation space, weight and/or the like, but reactions of a connected load, for example, in case of a short circuit of the load, can entail a complete failure of the energy supply for all of the connected loads. This is not admissible for the desired safety standard. Moreover, DE 10 2014 208 201 A1 discloses a device for supplying at least one load and DE 10 2017 208 030 B4 a vehicle electrical system for a motor vehicle for providing a redundant energy supply for safety loads and a motor vehicle.

SUMMARY

The described examples are to realize an improved redundancy with respect to an energy supply with comparatively low effort, in particular with respect to HAF.

In an example, power-distributing devices as well as a motor vehicle according to the independent claims may be described.

Advantageous developments are apparent by features of the dependent claims.

With respect to a generic power-distributing device according to the first aspect, in an example, the power-distributing device comprises a supply switching element for each of the at least two safety supply terminals, which is configured to electrically couple the respective safety supply terminal with the coupling apparatus depending on a switching state.

With respect to a power-distributing device according to the second aspect, in an example, a respective one of the at least two safety supply terminals may be immediately electrically connected with exactly one respective of the power source terminals.

With respect to a generic motor vehicle, the vehicle electrical system comprises a power-distributing device according to the described examples.

Among other things, the described examples are based on the idea that individual electrical devices or loads or also complete energy supply systems can be supplied with electrical energy from at least two redundantly provided energy sources, wherein reactions between the electrical devices and energy sources, respectively, between the safety supply terminals and between a respective power source terminal and a respective safety supply terminal can be largely avoided upon occurrence of a malfunction by the power-distributing device. Upon a malfunction of a respective supply path, a supply with electrical energy from at least one of the energy sources can in particular be achieved.

For this purpose, it is provided that an electrical coupling of the terminals to each other can be achieved by the coupling apparatus. By using the switching elements and correspondingly suitable switching, the desired functionality can be realized. Thus, it can be provided that the two energy sources, which are connected with the respective power source terminals, can be connected in parallel via the coupling apparatus in the turned-on state of the source switching elements to ensure the energy supply of the electrical devices. Therein, it can be achieved by the at least one source switching element that a malfunction of one of the energy sources does not have to affect the entire energy supply of the electrical devices. Namely, if a malfunction, for example a short circuit or the like, occurs in one of the electrical energy sources, the reaction to the remainder of the energy supply system can be largely avoided by switching the corresponding source switching element into the turned-off switching state. Thereby, it is possible to improve the reliability and the safety in particular of electrical devices, which are required for the safety of the intended operation of the motor vehicle.

According to an example, the coupling apparatus does not comprise electrical energy converters or electrical energy transformers such as for example voltage converters, in particular DC/DC converters or DC voltage couplers, inverters and/or the like. The coupling apparatus may be configured without converter or without transformer. Moreover, a terminal of an electrical device, which is able to supply electrical energy to the coupling apparatus depending on an operating state, may be connected with a terminal of the coupling apparatus, which can be separately turned off or electrically disconnected by a switching element of the coupling apparatus immediately associated with this terminal. In particular, the coupling apparatus comprises a corresponding switching element for each conventional supply terminal, by which the respective conventional supply terminal can be separately electrically turned off. According to an example, exclusively electrical devices may be connected with a conventional supply terminal, which do not satisfy the requirement to the highest safety standard according to Automotive Safety Integrity Level D. Such an electrical device can for example be an electrical generator, an electrical starter and/or the like. The conventional supply terminal may exclusively serve for connecting non-ASIL-compliant electrical devices. According to an example, exclusively ASIL-compliant electrical devices may be connected with a safety supply terminal, in particular electrical devices according to Automotive Safety Integrity Level D.

The same basically also applies to the safety supply terminals, to which safety-relevant electrical devices can be connected. According to an example, exclusively electrical devices may be connected with these terminals, which satisfy certain electrical safety conditions according to the initially mentioned standardization. This means, such electrical devices are for example to be suitable to largely avoid a reaction of a malfunction for example at an electrical device connected with this safety supply terminal to this safety supply terminal. The background is in that mechanical protective elements like fuses are unsuitable hereto in many cases due to their inert switching behavior. Therefore, particularly electronic protective elements are employed as a protective element, which for example can also comprise a switching element. However, protective elements can also be saved if it can for example be constructively prevented for a respective one of the electrical devices that a short circuit can for example occur in the area of the energy supply thereof. For example, this can be achieved by a series connection of capacitors instead of an individual capacitor, which is connected between the electrical potentials of the supply voltage, such that a short circuit in this capacitor does not result in a short circuit of the supply voltage. Moreover, it can be provided that in case of a malfunction occurring in the safety supply terminals, a protective element can be actuated. Of course, further relevant electrical characteristics can moreover be provided for safety reasons.

For example, if redundancy with respect to the braking system is requested, it can be provided that two braking systems independent of each other are provided, wherein one of the braking systems is connected with the first safety supply terminal and the second one of the braking systems is connected with the second safety supply terminal. If a malfunction occurs in one of the two safety supply terminals, which influences a braking system connected with this safety supply terminal, a corresponding deactivation will be affected by the power-distributing device according to the examples such that the other one of the braking systems can be further operated as intended. For this purpose, the supply switching elements are provided, by which it is possible to deactivate the respective safety supply terminal in case of a corresponding malfunction, namely depending on the switching state thereof. Moreover, there is the possibility of realizing the energy supply of both braking systems only from one of the two energy sources via the coupling apparatus and corresponding switch positions of the source switching elements, whereby a malfunction in one of the two energy sources either does not have to result in the function of the braking systems being impaired. Of course, this also applies to any further electrical devices, which can be connected with the safety supply terminals. Therein, it is additionally to be taken into account that the electrical devices do not have to be necessarily only electrical loads, but further electrical energy sources can also additionally be provided, or an electrical device can consume or provide electrical energy depending on a respective operating state.

However, it may be provided for the safety supply terminals that only electrical loads are connected here.

The switching element can be formed by one or more semiconductor switching elements. Moreover, the switching element can also comprise at least one electromechanical switching element, for example a relay, a contactor and/or the like. Basically, the semiconductor switching element can also be formed by an electromechanical switching element or any other suitable switching element.

In particular, the switching element may be formed as a semiconductor switching element, for example by a transistor, in particular a field effect transistor, a metal oxide field effect transistor (MOSFET), an insulated gate bipolar transistor (IGBT), but also by a gate turn-off thyristor (GTO) and/or the like or any other type of switching elements. These switching elements may be arranged integrated in the power-distributing device.

For providing the desired switching functionality by the power-distributing device, the semiconductor switching elements are operated in the switching operation. With respect to a semiconductor switching element using a transistor, the switching operation means that a very small electrical resistance is provided between the terminals of the transistor forming a switching path in a turned-on switching state such that a high current flow at very small residual voltage is possible. In contrast, in a turned-off switching state, the switching path of the transistor is high-ohmic, that is it provides a very high electrical resistance such that substantially no or only a very low, in particular negligible, current flow is present when high electrical voltage is applied to the switching path. A linear operation in transistors differs from it.

According to an example, the switching elements may be connected with at least one control apparatus, which provides corresponding control signals for the switching elements, such that the switching elements take the desired switching state. The control apparatus is at least connected with the switching elements, in particular the semiconductor switching elements of the power-distributing device. According to an example, the control apparatus may be formed at least partially integrated in the power-distributing device. Moreover, the power-distributing device, in particular the control apparatus, can comprise a communication interface, via which it is in communication link with a superordinated control, for example a vehicle control. In order to control a switching element, the control apparatus may be at least partially integrated in the power-distributing device because the switching operations are to be very fast affected for example in case of a hard short circuit, for example, faster than about 500 µs, especially, faster than about 100 µs.

For example, the communication interface can be formed wired and/or else wireless. A wirelessly formed communication link can for example be based on radio, in particular short-range radio. According to an example, each of the switching elements may comprise an own communication interface, by which it is in communication link with the control apparatus. In particular, the device-side communication interface can be connected with a respectively integrated part of a switching element control, which in turn is connected at least with the semiconductor switching elements, to control them with respect to their switching state in presettable manner. Thereby, an activation or a deactivation of the respective supply path can be controlled by the control apparatus.

The control apparatus itself can be provided as a separate component. However, it may be a constituent of the power-distributing device and particularly arranged integrated in it.

Accordingly, the described examples may allow enabling at least a partial operation of the vehicle electrical system in case of very different malfunction types such that especially safety-relevant systems can be reliably further operated. Thereby, the described examples may also allow being able to achieve the safety requirements according to the initially indicated standards. This is supported in that at least two safety supply terminals are also provided according to the described examples. Independently thereof, one or more conventional supply terminals can of course be provided, however, wherein the power-distributing device directs the attention particularly to the reliable functionality at the safety supply terminals.

The described examples may be suitable for the employment at low voltage. According to an example, low voltage may denote an electrical voltage, which is less than about 60 V, in particular less than high voltage according to the standard ECE R 100 or the like. According to an example, the vehicle electrical system may be a DC voltage vehicle electrical system, which is supplied with a DC voltage, for example can be configured for a rated voltage of about 12 V, 24 V, 48 V or the like. However, the described examples are not restricted thereto.

According to a development, the power-distributing device comprises at least one conventional supply terminal and at least one supply switching element for the at least one conventional supply terminal, which is configured to electrically couple the conventional supply terminal with the coupling apparatus depending on a switching state. According to an example, the supply switching element may be controlled by the control apparatus. In this manner, electrical devices can also be supplied with electrical energy by the power-distributing device, which have a lower relevance to the safety, for example a seat heater, a vehicle interior illumination, a radio and/or the like. With the power-distributing device, thus, not only a redundant energy supply for safety-relevant electrical devices, but also an energy supply of further, not safety-relevant electrical device can be achieved at the same time without having to impair the redundant energy supply for the safety-relevant electrical devices.

Further, in an example, the at least one conventional supply terminal can be electrically coupled with the first safety supply terminal by a first supply switching element and with the second safety supply terminal by a second supply switching element. Thereby, it is possible to couple the conventional supply terminal with one or even to both of the at least two safety supply terminals as needed. Hereby, an at least provisional energy supply for one or both of the at least two safety supply terminals can in particular be achieved if a further energy source is connected with the conventional supply terminal and the energy supply via the first and/or the second power source terminal is at least partially faulty. Thereby, the reliability can be further increased. Depending on the respective switching states of the supply switching elements, even an electrical connection between the at least two safety supply terminals can in particular be achieved.

Further, in an example an energy source is connected with the at least one conventional supply terminal. Hereby, additional redundancy can be achieved because the energy supply for the safety supply terminals can be further improved. Thus, it can be provided that electrical energy can be provided at least for one of the safety supply terminals in case of a malfunction to ensure the electrical devices connected hereto at least partially independently of an energy supply by at least one of the at least two power source terminals. This energy supply can be ensured for a presettable period of time. Moreover, it can be provided that sufficient electrical energy is provided to reliably actuate a respective protective element in one or more faulty electrical devices. The energy source can for example be an accumulator, but also a fuel cell, photovoltaic and/or the like. In particular, it can comprise a lead-acid accumulator, which can for example be configured for a rated voltage of about 12 V or 24 V, as it is currently still often employed in vehicle electrical systems of motor vehicles.

According to a development, a bypass circuit is connected in parallel with at least one of the switching elements, which comprises at least one diode. This takes into account that the switching element usually allows a bidirectional current flow in the turned-on switching state. Thereby, it is possible to realize additional redundancy functions. Moreover, this development also allows realizing a function test for the respective switching element. This allows further improving the safety and reliability of the power-distributing device. Of course, the bypass circuit is not restricted to the employment of a diode. Of course, further electronic components can in particular also be included by the bypass circuit to be able to specifically and adequately adapt the function thereof. Thus, it can for example be provided that an electrical resistor is connected in series with the diode. Thereby, a limited current flow can be achieved, by which a closed current supply can for example be achieved, if in a deactivated state of the vehicle electrical system if the motor vehicle is stopped outside of the intended drive operation, or an actuation of a protective element can be assisted or allowed. However, the series connection of the diode and the electrical resistor can also serve to limit the current flow upon occurrence of a short circuit. Thereby, not only the diode can be protected from overstress, but an energy input into the place of the short circuit can also be limited. According to functionality of the power-distributing device, a bypass circuit can be connected in parallel only with one of the switching elements or also with multiple of the switching elements or even with all of the switching elements. Instead of the diode or in addition, a transistor or the like electronic component suitably operated in the switching operation can of course also be provided. Of course, the bypass circuit can also comprise an own bypass switching element instead of the diode or in addition.

Moreover, in an example, a bypass circuit may be respectively arranged between the coupling apparatus and the at least two safety supply terminals, wherein the bypass circuits are configured to allow a current flow exclusively to the respective safety supply terminals. Here, the bypass circuits are thus connected in parallel with the respective supply switching elements. Particularly advantageously, such a bypass circuit includes a series connection of a diode or a transistor and an electrical resistor. If a transistor is employed, a linear operation of the transistor can here also be provided, whereby the transistor itself is capable of providing an electrical resistance such that the electrical resistor as a separate component can for example be saved. Thereby, the multiple energy sources can for example be electrically decoupled from each other. The use of the electrical resistor moreover also allows an at least partially non-reactive decoupling of the energy sources, for example if a malfunction in the manner of a short circuit occurs at a location of the vehicle electrical system or the like.

Furthermore, in an example, a bypass circuit is connected in parallel with at least one of the at least two source switching elements, which comprises at least one electrical resistor and an auxiliary switching element. Hereby, it can be achieved that a partial energy supply by the corresponding energy source is allowed even if the respective source switching element is in the turned-off switching state. For example, this can be used to achieve a closed current supply if the vehicle electrical system otherwise is largely put out of operation, for example outside of the intended drive operation of the motor vehicle.

In order to be able to achieve a compact and reliable component, in an example, the power-distributing device comprises a housing, at which the terminals are arranged. For example, a protection with respect to external stresses, in particular mechanical and/or atmospheric stresses, can be achieved by the housing. At the same time, it can be achieved that elements of the power-distributing device can be reliably held in their position. This can also be achieved for electrical lines of the power-distributing device, in particular with respect to the coupling apparatus.

Of course, the advantages and effects specified for the power-distributing device of the first aspect also equally apply to the power-distributing device of the second aspect, if applicable, and vice versa. Furthermore, the advantages and effects specified for the power-distributing devices of the first and/or the second aspect also apply to the motor vehicle equipped with one of the power-distributing devices and vice versa.

The control apparatus for the motor vehicle also belongs to the described examples. The control apparatus can comprise a data processing device or a processor device, which is configured to perform the control of the power-distributing device according to the described examples. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured, upon execution by the processor device, to perform the control of the power-distributing device according to the described examples. The program code can be stored in a data memory of the processor device.

The motor vehicle according to the described examples may be configured as a car, in particular as a passenger car or truck, or as a passenger bus or motorcycle.

The examples also include the combinations of the features of the described examples. Thus, the examples also includes realizations, which each comprise a combination of the features of multiple of the described examples if the examples have not been described as mutually exclusive.

BRIEF DESCRIPTION OF DRAWINGS

In the following, examples are described. Hereto, there shows.

DESCRIPTION

The execution examples explained in the following are examples. In the execution examples, the described components of the examples each represent individual features to be considered independently of each other, which also each develop the examples independently of each other. Therefore, the disclosure also is to include combinations of the features of the examples different from the illustrated ones. Furthermore, the described examples can also be supplemented by further ones of the already described features.

In the figures, identical reference characters each denote functionally identical elements.

Figure 1:
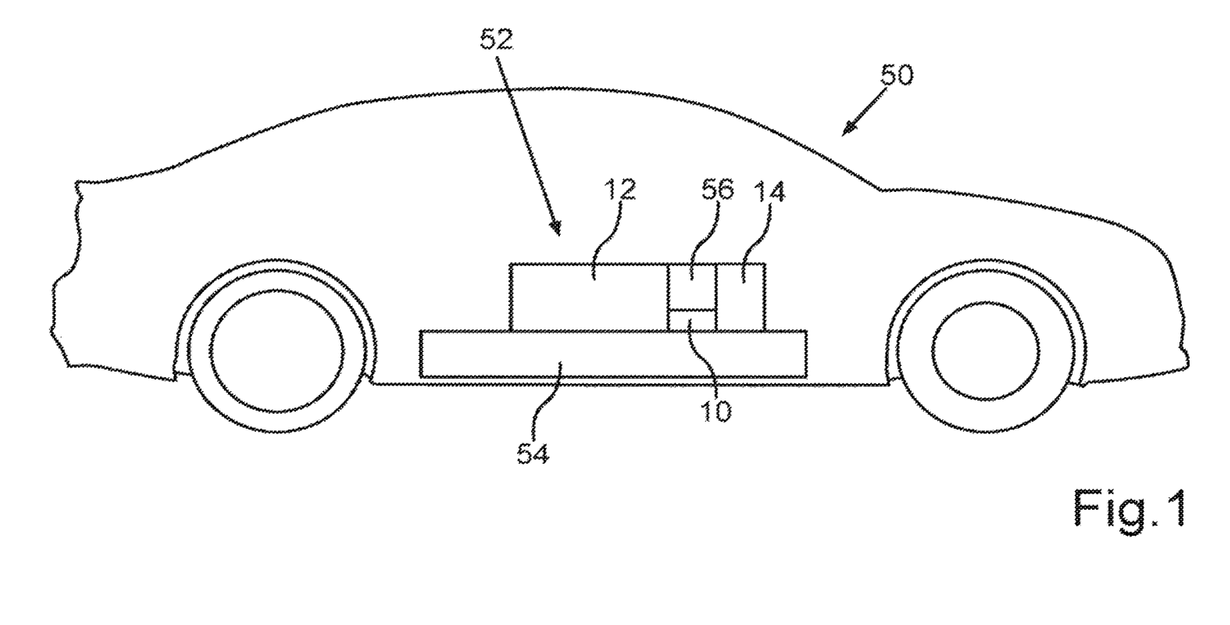
FIG. 1 in a schematic side view, an electrically drivable motor vehicle with a vehicle electrical system, to which an electrical drive device and further electrical devices are connected.

FIG. 1 shows an electrically drivable motor vehicle in a schematic side view, which is here configured as an electric vehicle 50. The electric vehicle 50 comprises a vehicle electrical system 52, to which a synchronous machine 12 for driving the electric vehicle 50 in an intended drive operation is connected. Presently, the synchronous machine 12 is configured as a multi-phase synchronous machine 12. Further, a multi-phase inverter 56 as an energy converter is connected with the vehicle electrical system 52 and to the synchronous machine 12. Further, a battery 54 is connected with the vehicle electrical system 52, which serves for the electrical energy supply of the vehicle electrical system 52. Here, the reference character 54 is representative of a high-voltage battery and two redundant low-voltage batteries. However, other combination possibilities are basically also conceivable here, such as for example a fuel cell and a low-voltage battery, a high-voltage battery and a low-voltage battery, two low-voltage batteries or the like. For the purpose of the energy distribution, the vehicle electrical system 52 comprises a power-distributing device 10, as it will be further explained in the following. Further, electrical devices are connected with the vehicle electrical system 52, which are collectively denoted by the reference character 14 in this figure. Even if the motor vehicle 50 is presently formed as an electric vehicle, the described examples are not restricted hereto and can similarly also be employed for example in a motor vehicle, which is drivable by a conventional combustion engine.

Figure 2:
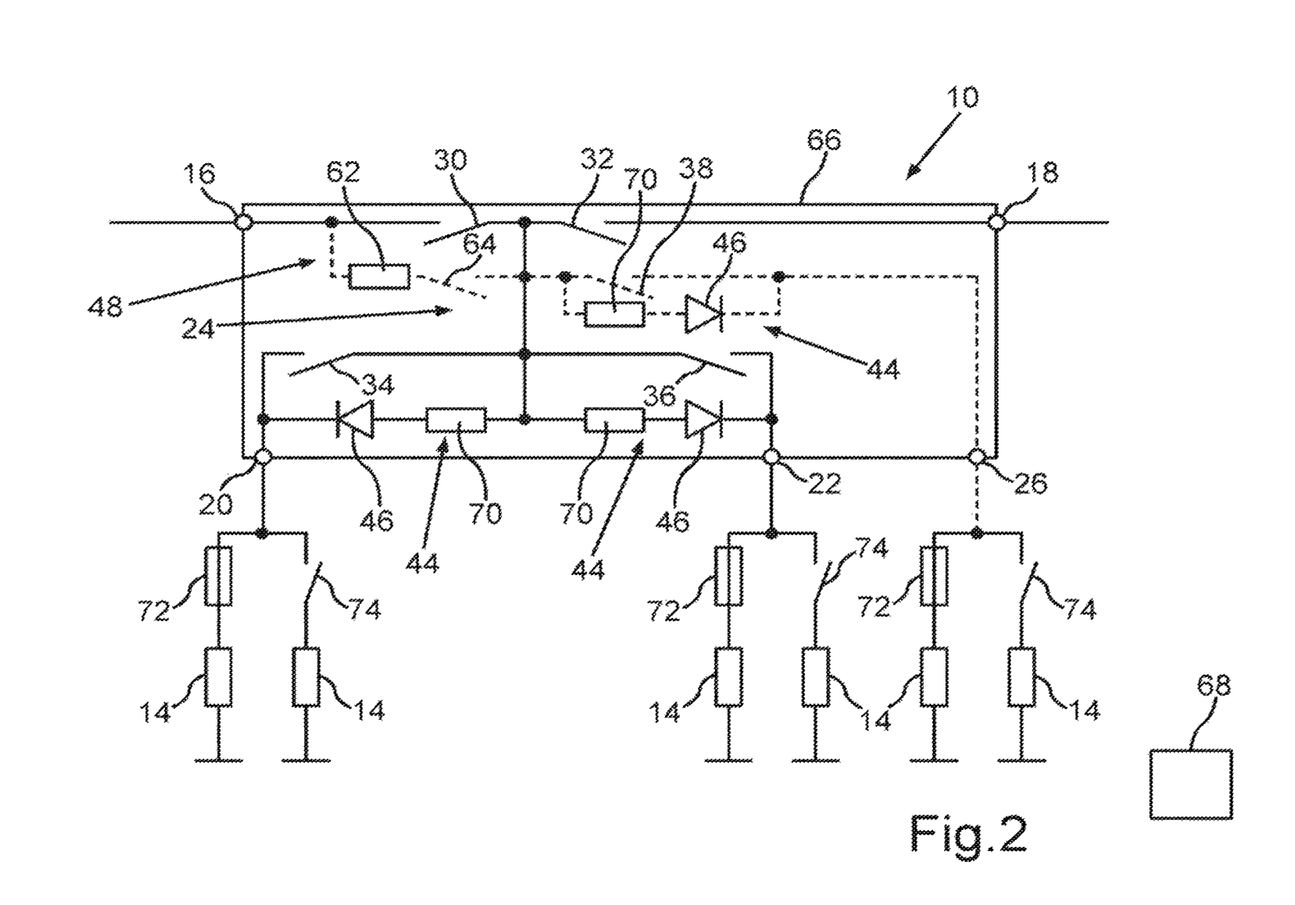
FIG. 2 in a schematic circuit diagram representation, a first configuration of a power-distributing device for the vehicle electrical system according to FIG. 1, wherein the vehicle electrical system is formed for an at least partially redundant and non-reactive energy supply of the electrical devices connected to the vehicle electrical system.

FIG. 2 shows a first configuration of a power-distributing device 10 for the vehicle electrical system 52 of the motor vehicle 50 according to FIG. 1 in a schematic circuit diagram representation, wherein the vehicle electrical system 52 is formed for an at least partially redundant and non-reactive energy supply of the electrical devices 14 connected with the vehicle electrical system 52.

The power-distributing device 10 comprises a housing 66, at which a first power source terminal 16 and a second power source terminal 18 are arranged electrically insulated from each other. A first battery is connected with the first power source terminal 16 and a second battery is connected with the second power source terminal 18. However, this is not illustrated in FIG. 2.

Presently, it is provided that the vehicle electrical system 52 is designed for a DC voltage as a rated voltage of about 12 V. In alternative configurations, however, the rated voltage can also be selected varying. The vehicle electrical system 52 serves for distributing electrical energy between the electrical devices 14 connected thereto as well as the batteries.

Besides conventional loads like a seat heater, a vehicle interior illumination, a radio and/or the like, the electrical devices 14 can also comprise safety-relevant devices such as an electrical steering system (for example steer-by-wire), an electrical braking system (for example brake-by-wire) and/or further electrical systems (for example x-by-wire), which serve for guiding the motor vehicle. In particular in automated driving, particularly in the at least partially autonomous driving, however, particular safety requirements have to be considered. Among other things, this relates to the supply with electrical energy. Therefore, the described examples may be directed to applications, which for example verifiably achieve the highest safety integrity according to the Automotive Safety Integrity Level D (briefly ASIL D according to ISO 26262) as well as associated laws such as for example ECE R79 for steer-by-wire.

Such electrical devices are also referred to as safety devices or safety loads in the following. Therefore, the power-distributing device 10 also comprises at least two safety supply terminals 20, 22 besides the two power source terminals 16, 18, to which the safety devices can be connected. Therein, it is possible that an individual one of the safety devices does not have to be connected with only a single one of the safety supply terminals 20, 22. According to need and construction, a respective one of the safety devices can also be connected with both safety supply terminals 20, 22, wherein it is to be ensured by the construction of the safety device that a reaction of one of the safety supply terminals 20, 22 to the respectively other one of the safety supply terminals 20, 22 is avoided in case of a malfunction.

At least for the electrical devices 14, which are connected with the safety supply terminals 20, 22, additional safety measures are provided. A fuse is a standard element for the line protection. Usually, it cannot always sufficiently prevent reactions. But it can be actuated as described here and thus the safety supply terminal can be reactivated after a time x. In this time, this safety supply terminal is disconnected from the sources and only supplied via the bypass circuit 44, respectively. Additional safety measures at the electrical devices 14 can for example be either the electronic switching element 74 or a constructive avoiding measure. A separate protective element then does not have to be provided. Thus, it is either provided that a protective element 72 or an additional switching element 74 is connected in series with such an electrical device. If a malfunction occurs at a respective one of the electrical devices 14, thus, the malfunction can be selected and deactivated by actuating the corresponding protective element 72 or by turning off the corresponding switching element 74 to allow a further operation of the further electrical devices 14 connected with the respective terminal 20, 22, 26 after deactivation.

By a coupling apparatus 24 of the power-distributing device 10, an electrical connection between the respective terminals 16, 18, 20, 22 can be established as will be further explained in the following. With the circuit structure according to FIG. 2, thus, an energy supply from two alternative energy sources, which themselves are not illustrated in the figures, is available for the two safety supply terminals 20, 22. At the same time, absence of reaction can also be achieved such that in case of the occurrence of a malfunction in one of the two energy sources or also in the area of one of the safety supply terminals 20, 22, a largely safe energy supply for the respectively other of the safety supply terminals 20, 22 can be achieved. Thereby, the high requirement of the above mentioned standardization and laws can also be achieved.

For example, the coupling apparatus 24 can comprise one or more busbars, terminal blocks, connection lines and/or the like. The coupling apparatus 24 may be at least partially arranged in the housing 66. In particular, it can be nearly completely arranged in the housing. In the present configuration, the terminals 16, 18, 20, 22 are not immediately connected with the coupling apparatus 24. Thus, it is presently provided for the power source terminals 16, 18 that a source switching element 30, 32 is respectively provided for each of the at least two power source terminals 16, 18, which is configured to electrically couple the respective power source terminal 16, 18 to the coupling apparatus 24 depending on a switching state. Thereby, an electrical connection can be activated or deactivated as needed.

Thus, it can be provided that an energy supply is only effected from one of the energy sources via the respective power source terminal 16, 18. Of course, an at least partially parallel energy supply can also be provided as needed if both source switching elements 30, 32 are in the turned-on switching state. However, if a malfunction, in particular a short circuit, occurs in the area of one of the energy sources, it can be achieved by switching the respective source switching element 30, 32 that the malfunction does not affect the other one of the energy sources. A continued energy supply can then be achieved with the other one of the energy sources.

Basically, a comparable functionality can also be achieved for the safety supply terminals 20, 22, which are not immediately electrically connected with the coupling apparatus 24. Namely, the safety supply terminals 20, 22 are presently electrically coupled to the coupling apparatus 24 via a respective supply switching element 34, 36 for each of the at least two safety supply terminals 20, 22. The supply switching elements 34, 36 are configured to electrically couple the respective safety supply terminal 20, 22 to the coupling apparatus 24 depending on a switching state. Thereby, it can now be achieved that upon a malfunction in the area of one of the safety supply terminals 20, 22, by switching the corresponding supply switching element 34, 36 into the turned-off switching state, this safety supply terminal 20, 22 can be deactivated such that a reaction to the other one of the safety supply terminals 20, 22 can be avoided. For the electrical devices connected with this safety supply terminal 20, 22, therefore, the intended operation can be maintained.

Moreover, a reaction to the energy sources can also be avoided. This is in particular advantageous if the malfunction could entail an overload of the corresponding energy source, for example if a short circuit would occur at one of the corresponding safety supply terminals 20 or 22. Thus, the described examples may allow selecting the malfunction and reducing even if not completely avoiding its effect on the vehicle electrical system 52 overall.

It is further apparent from FIG. 2 that the power-distributing device 10 also comprises a conventional supply terminal 26 and at least one supply switching element 38 for the conventional supply terminal 26. The supply switching element 38 is configured to electrically couple the conventional supply terminal 26 to the coupling apparatus 24 depending on a switching state. Further electrical devices 14 can be connected with the conventional supply terminal 26, which are not particularly relevant to the safety, such as for example a seat heater, an interior illumination and/or the like. However, this can be optionally provided as it is shown in FIG. 2 by a the dashed representation. For these electrical devices 14, the additional safety requirements either do not have to be realized as it is required for the electrical devices 14, which are connected with the safety supply terminals 20, 22.

Basically, the switching elements 30, 32, 34, 36, 38 can be configured as electromechanical switching elements, for example in the manner of a contactor or the like. However, it is presently provided that the switching elements 30, 32, 34, 36, 38 are formed by transistor-based semiconductor switching elements, which can prevent a current flow in both directions in the turned-off state. Such switching elements are known to the expert, wherefore reference is presently made to the corresponding professional literature in this respect.

FIG. 2 further shows that a bypass circuit 44 is respectively connected in parallel with the supply switching elements 34, 36, 38, which comprises a series connection of a diode 46 and an electrical resistor 70. A polarity of the diodes 46 of the bypass circuits 44 is selected such that the bypass circuits 44 each allow a direct current from the coupling apparatus 24 to the respective one of the terminals 20, 22, 26. With the bypass circuits 44, it can be achieved that a partial energy supply of the corresponding one of the terminals 20, 22, 26 is still possible even if the corresponding supply switching element 34, 36, 38 is in the turned-off switching state. The turned-off switching state can for example be taken if the motor vehicle 50 is outside of the intended drive operation, if it is for example stopped. A closed current supply can then for example be achieved by the bypass circuits 44.

Moreover, the bypass circuit 44 can allow, in case of occurrence of a malfunction at one of the terminals 20, 22, 26, to allow enough electrical current for actuating a protective element 72 in the area of the concerned electrical device 14. At the same time, a current flow can be limited by suitable dimensioning of the electrical resistor 70 such that the energy supply by the energy sources is not impaired as possible.

It is further apparent from FIG. 2 that a bypass circuit 48 is connected in parallel with the source switching element 30, which comprises an electrical resistor 62 and an auxiliary switching element 64. The bypass circuit 48 serves for providing a close current supply for electrical devices 14 in the deactivated state of the vehicle electrical system 52, which require this for their intended use, for example a clock, an alarm system and/or the like. This closed current supply can be deactivated by the auxiliary switching element 64 upon occurrence of a malfunction.

FIG. 2 further schematically shows a control apparatus 68, to which all of the switching elements are presently connected and which are supplied with corresponding switching signals by the control apparatus 68. The control apparatus 68 can be a part of a superordinated vehicle control (not illustrated).

Figure 3:
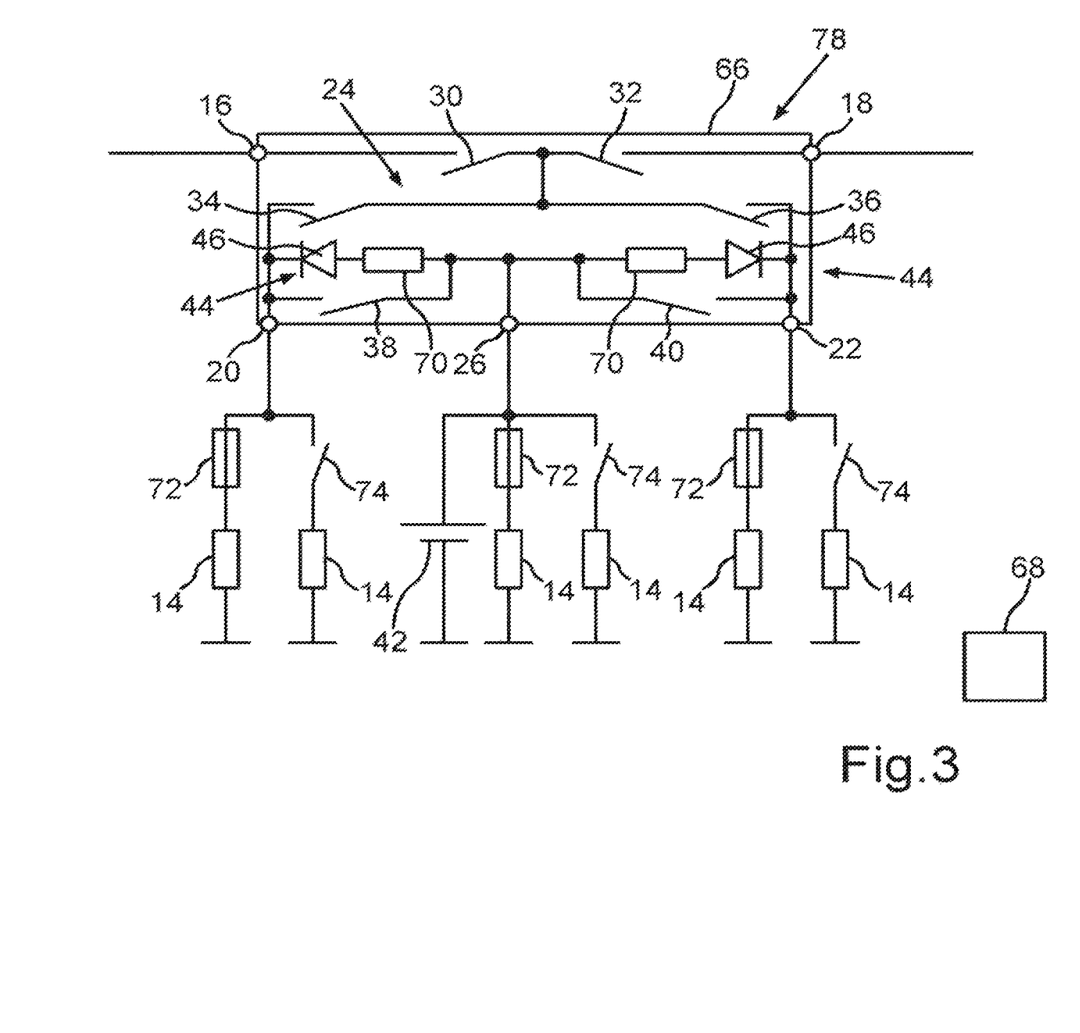
FIG. 3 in a schematic circuit diagram representation like FIG. 2, a second configuration of a power-distributing device, in which an energy source is additionally connected on the load side.

FIG. 3 shows a second configuration of a power-distributing device 78, which is based on the power-distributing device 10 according to FIG. 1, wherefore only the differences from the first configuration are explained in the following.

With respect to the first configuration, a battery 42 is connected with the conventional supply terminal 26 in the second configuration. In this configuration, the conventional supply terminal 26 is no longer directly connected with the coupling apparatus 24, but instead to the safety supply terminals 20, 22 via respective supply switching elements 38, 40. A bypass circuit 44 is respectively connected in parallel with the supply switching elements 38, 40, the function of which was already explained based on the first configuration.

This circuit structure has the advantage that the number of the bypass circuits 44, 48 can be reduced. In the undisturbed state during the intended drive operation, an energy supply for the electrical devices 14, which are connected with the conventional supply terminal 26, can be achieved via the supply switching elements 34, 36, 38, 40 as well as the source switching elements 30, 32 from a respective one of the energy source connected hereto. Thereby, the battery 42 can also be charged in this operating state, such that it is capable of providing an energy supply also for the electrical devices connected to the safety supply terminals 20, 22 outside of the intended drive operation or upon occurrence of a malfunction. The further functionalities substantially correspond to that already explained to the first configuration.

A closed current supply can be achieved from the battery 42 for the safety supply terminals 20, 22. Similarly, energy of the battery 42 can be provided to actuate a protective element 72 in case of need. Thereby, the bypass circuit 48 of the first configuration can in particular also be saved.

Figure 4:
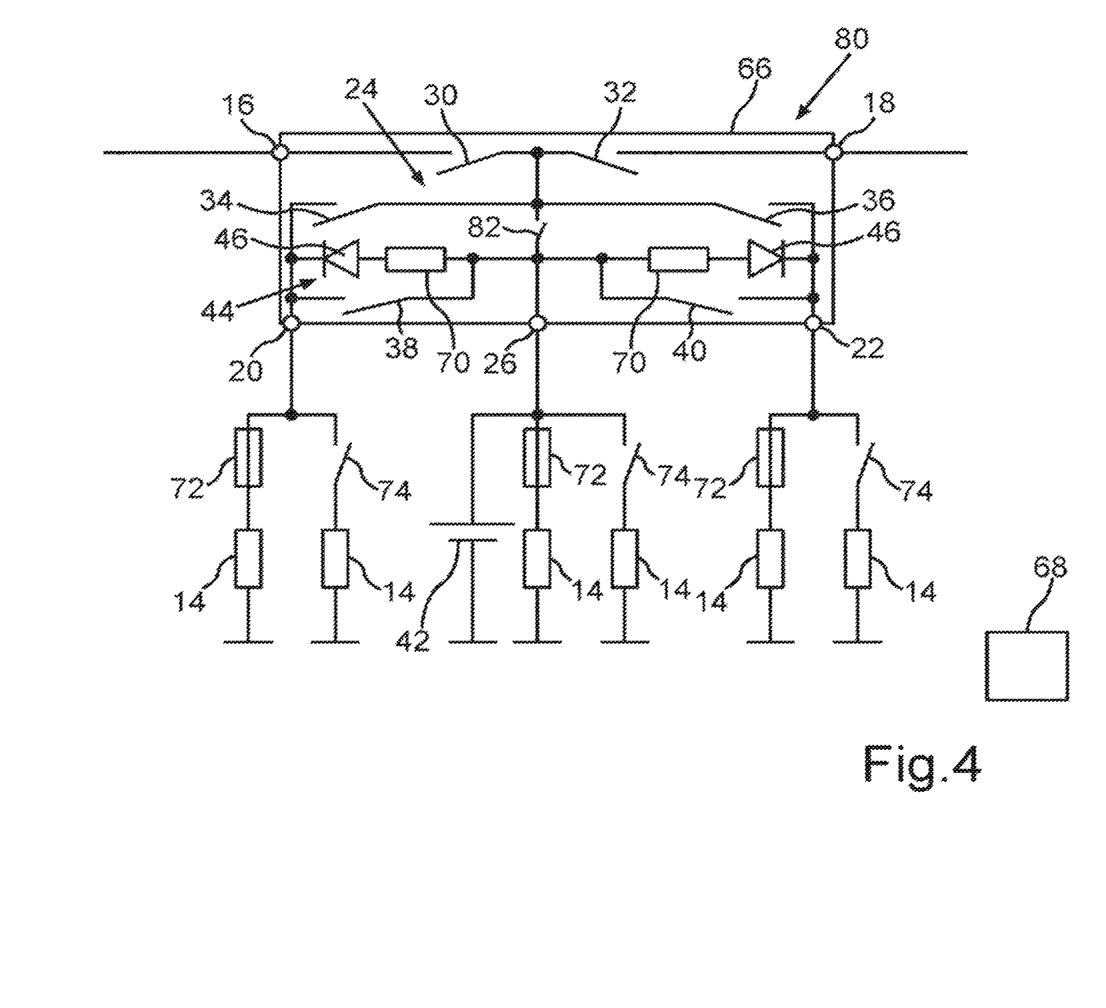
FIG. 4 in a schematic circuit diagram representation like FIG. 3, a third configuration of a power-distributing device.

FIG. 4 shows a third configuration of a power-distributing device 80, which is based on the second configuration, wherefore only the differences from the second configuration are explained in the following.

The third configuration differs from the second configuration in that the supply switching elements 38, 40 are replaced with a supply switching element 82. Thereby, the conventional supply terminal 26 is again connected with the coupling apparatus 24 via the supply switching element 82. Thereby, a switching element can be saved, wherein the functionality can be nearly maintained, wherefore reference is made to the preceding explanations in this respect.

Figure 5:
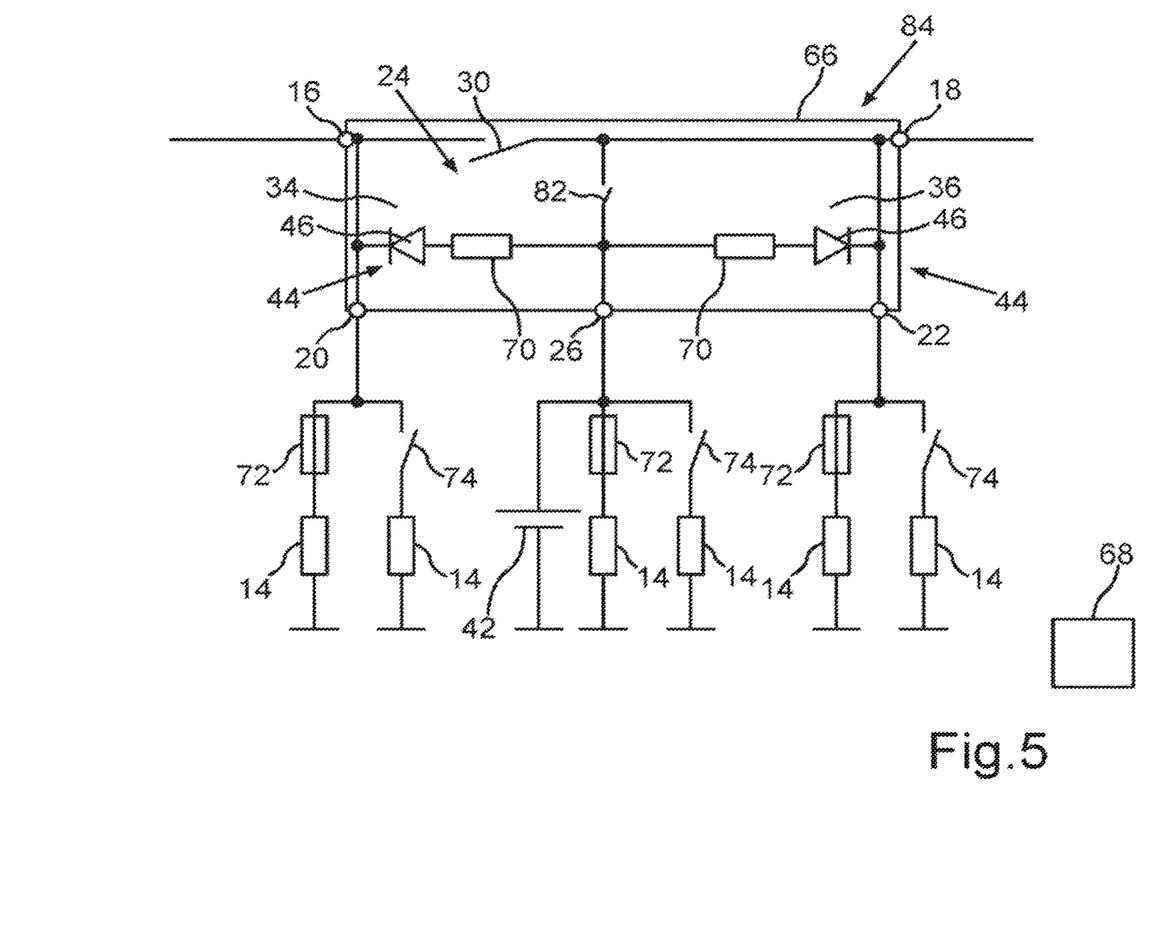
FIG. 5 in a schematic circuit diagram representation like FIG. 2, a fourth configuration of a power-distributing device.

FIG. 5 shows a fourth configuration of a power-distributing device 84, in which a component effort is considerably reduced. In this fourth configuration, it is provided that the power-distributing device 84 comprises a first and a second power source terminal 16, 18, a first and a second safety supply terminal 20, 22, a conventional supply terminal 26 and a coupling apparatus 24 for electrically coupling the terminals 16, 18, 20, 22, 26. Insofar, this configuration corresponds to the previous configurations.

For the power source terminal 16—as in the previous configurations—a source switching element 30 is provided, via which this power source terminal 16 is connected with the coupling apparatus 24. In contrast, the power source terminal 18 is immediately connected with the coupling apparatus 24. The conventional supply terminal 26 is connected with the coupling apparatus 24 as in the third configuration according to FIG. 4. Further, a respective one of the two safety supply terminals 20, 22 is electrically connected with exactly one respective of the power source terminals 16, 18.

This reduced version too allows a redundant supply of the safety supply terminals 20, 22. Nevertheless, it is to be considered that upon a significant malfunction of one of the energy sources, in particular a short circuit, an energy supply can only be ensured for the safety supply terminal 20 or 22 connected with the other energy source. This can be taken into account in that very relevant electrical devices 14 are for example connected with both safety supply terminals 20, 22 or these electrical devices 14 are redundantly provided and are each connected with one of the two safety supply terminals 20, 22.

Overall, the examples show how an energy supply for particularly high requirements can be provided, as they are for example required for autonomous driving, with the power-distributing device.

The examples exclusively serve for explaining an invention and are not supposed to limit the scope of an invention.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

The invention claimed is:

1. A power-distributing device for a vehicle electrical system of a motor vehicle, comprising:
   at least two power source terminals;
   at least two safety supply terminals;
   a coupling apparatus to electrically couple the at least two power source terminals to the at least two safety supply terminals;
   at least two source switching elements, each source switching element of the at least two source switching elements configured to electrically couple a power source terminal of the at least two power source terminals with the coupling apparatus depending on a switching state of the at least two source switching elements;
   at least two safety supply switching elements, each safety supply switching element of the at least two safety supply switching elements, configured to electrically couple a safety supply terminal of the at least two safety supply terminals with the coupling apparatus depending on a switching state of the at least two safety supply switching elements; and
   a bypass circuit including at least one diode, the bypass circuit connected in parallel with a safety supply switching element of the at least two safety supply switching elements and configured to, with a switching state of the safety supply switching element being a turned-off state, supply power to a safety supply terminal of the at least two safety supply terminals that corresponds to the safety supply switching element through the bypass circuit.

2. The power-distributing device according to claim 1, further comprising at least one supply terminal and at least one supply switching element for the at least one supply terminal, configured to electrically couple the at least one supply terminal with the coupling apparatus depending on a switching state of the at least one supply switching element.

3. The power-distributing device according to claim 2, wherein the at least one supply terminal is electrically couplable with a first safety supply terminal of the at least two safety supply terminals by a first supply switching element of the at least one supply switching element and with a second safety supply terminal of the at least two safety supply switching elements by a second supply switching element of the at least one supply switching element.

4. A power-distributing device for a vehicle electrical system of a motor vehicle, comprising:
   at least two power source terminals;
   at least two safety supply terminals respectively corresponding to the at least two power source terminals;

at least one supply terminal;

a coupling apparatus to electrically couple the at least two power source terminals, the at least two safety supply terminals, and the at least one supply terminal;

at least one source switching element for a power source terminal of the at least two power source terminals, configured to electrically couple the power source terminal with the coupling apparatus depending on a switching state of the at least one source switching element;

a bypass circuit including at least one diode, the bypass circuit connected in parallel with the at least one source switching element and configured to, with a switching state of the at least one source switching element being a turned-off state, supply power through the bypass circuit to a safety supply terminal of the at least two safety supply terminals; and a supply switching element for the at least one supply terminal, configured to electrically couple the at least one supply terminal with the coupling apparatus depending on a switching state of the supply switching element, wherein each safety supply terminal of the at least two safety supply terminals is immediately electrically connected with exactly one respectively corresponding power source terminal of the at least two power source terminals.

5. The power-distributing device according to claim 4, wherein an energy source is connected with the at least one supply terminal.

6. The power-distributing device according to claim 2, wherein the bypass circuit is connected in parallel with at least one switching element among the at least two safety supply switching elements and the at least one supply switching element.

7. The power-distributing device according to claim 6, wherein the bypass circuit is arranged between the coupling apparatus and at least one safety supply terminal of the at least two safety supply terminals, wherein the bypass circuit is configured to allow a current flow exclusively to one safety supply terminal of the at least two safety supply terminals.

8. The power-distributing device according to claim 4, wherein the bypass circuit further includes:
   an electrical resistor, and
   an auxiliary switching element, and
the bypass circuit is connected in parallel with at least one source switch element of the at least one source switching element.

9. The power-distributing device according to claim 4, comprising a housing, at which the at least two power source terminals, the at least two safety supply terminals, and the at least one supply terminal are arranged.

10. A motor vehicle comprising a vehicle electrical system configured with the power-distributing device of claim 1.

11. A motor vehicle comprising a vehicle electrical system configured with the power-distributing device of claim 4.

12. A power-distributing device for a vehicle electrical system of a motor vehicle, comprising:
   at least two power source terminals;
   at least two safety supply terminals;
   a coupling apparatus to electrically couple the at least two power source terminals to the at least two safety supply terminals;
   at least two source switching elements, each source switching element of the at least two source switching elements configured to electrically couple a power source terminal of the at least two power source terminals with the coupling apparatus depending on a switching state of the at least two source switching elements;
   at least two safety supply switching elements, each safety supply switching element of the at least two safety supply switching elements configured to electrically couple a safety supply terminal of the at least two safety supply terminals with the coupling apparatus depending on a switching state of the at least two safety supply switching elements;
   at least one supply terminal and at least one supply switching element for the at least one supply terminal, the at least one supply switching element configured to electrically couple the at least one supply terminal with the coupling apparatus depending on a switching state of the at least one supply switching element; and
   a bypass circuit, which includes at least one diode, is connected in parallel with at least one switching element among the at least two safety supply switching elements and the at least one supply switching element.

13. The power-distributing device according to claim 12, wherein the bypass circuit is arranged between the coupling apparatus and at least one safety supply terminal of the at least two safety supply terminals, wherein the bypass circuit is configured to allow a current flow exclusively to one safety supply terminal of the at least two safety supply terminals.

\* \* \* \* \*